United States Patent
Hao et al.

(10) Patent No.: US 10,110,103 B1
(45) Date of Patent: Oct. 23, 2018

(54) ELECTRIC DRIVE SYSTEM ENHANCEMENT USING A DC-DC CONVERTER

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Suresh Gopalakrishnan, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/629,166

(22) Filed: Jun. 21, 2017

(51) Int. Cl.
| | |
|---|---|
| *G05B 11/28* | (2006.01) |
| *H02K 19/10* | (2006.01) |
| *H02M 3/338* | (2006.01) |
| *B60K 6/46* | (2007.10) |
| *H02P 6/06* | (2006.01) |
| *H02K 29/08* | (2006.01) |
| *H02K 19/20* | (2006.01) |

(52) U.S. Cl.
CPC ............ *H02K 19/103* (2013.01); *B60K 6/46* (2013.01); *H02K 19/20* (2013.01); *H02K 29/08* (2013.01); *H02M 3/338* (2013.01); *H02M 3/3381* (2013.01); *H02P 6/06* (2013.01)

(58) Field of Classification Search
CPC .................................. H02K 19/03; B60K 6/46
USPC ......................................................... 318/599
See application file for complete search history.

(56) References Cited

U.S. PATENT DOCUMENTS

| | | | | |
|---|---|---|---|---|
| 5,373,195 A | * | 12/1994 | De Doncker | B60L 11/005 307/45 |
| 5,710,699 A | * | 1/1998 | King | B60L 11/005 318/139 |
| 6,587,356 B2 | * | 7/2003 | Zhu | H02M 1/34 323/908 |
| 9,387,766 B2 | | 7/2016 | Hao et al. | |
| 2011/0011658 A1 | * | 1/2011 | Takizawa | B60L 3/0046 180/65.31 |
| 2013/0234675 A1 | * | 9/2013 | King | B60L 11/1814 320/163 |
| 2014/0002023 A1 | * | 1/2014 | Ichikawa | B60L 11/1812 320/109 |
| 2015/0288290 A1 | * | 10/2015 | Iwamoto | H02M 3/158 363/21.06 |

* cited by examiner

Primary Examiner — Erick Glass
(74) Attorney, Agent, or Firm — Quinn IP Law (57) ABSTRACT

An electric drive system includes bus rails carrying a bus voltage, an energy storage system (ESS), and a power inverter. The system includes a voltage converter connected to the bus rails and having an inductor coil, semiconductor switches, a bypass switch connected to a positive bus rail, and a capacitor. A polyphase electric machine is electrically connected to the power inverter. A controller executes a method in which operation of the converter is regulated based on power, torque, and speed values of the electric machine. The converter is selectively bypassed by closing the bypass switch under predetermined high-power/high-torque conditions, with the bus voltage adjusted until it is equal to the battery output voltage. The bypass switch is opened and the bus voltage thereafter regulated to a predetermined voltage.

20 Claims, 4 Drawing Sheets

ELECTRIC DRIVE SYSTEM ENHANCEMENT USING A DC-DC CONVERTER

INTRODUCTION

An electric machine is capable of generating motor torque at levels useful for performing work, for instance in an electric drive system. When the electric drive system forms part of a powertrain of a hybrid or battery electric vehicle, the generated motor torque may be used to propel the vehicle. Alternatively, the torque provided by the electric machine may be used generate electricity. Electricity generated in excess of required amounts may be stored in a battery pack for later use.

The electric machine is often embodied as a polyphase/alternating current device, and therefore electric drive systems may include a power inverter. A voltage output of the power inverter is controlled via the transmission of electronic gate signals to sets of semiconductor switches of the power inverter, e.g., pulse width modulation. During power generating modes, switching control of the power inverter converts the polyphase voltage from the electric machine into a direct current voltage suitable for storage in the battery pack. Likewise, switching control of the power inverter is able to convert a direct current voltage into a polyphase voltage to drive the electric machine during motoring modes. A boost converter may also be used to selectively increase an output voltage of the battery pack and thereby meet peak power requirements of the electric machine and connected electrical components.

SUMMARY

An electric drive system and switching control method are disclosed herein, with the method intended to improve the overall operating efficiency of the electric drive system using a downsized direct-current/direct-current (DC-DC) converter. To ensure responsive operation at peak power, electric drive systems ordinarily will use a DC-DC converter that is sized and rated to match peak power requirements, for instance 90 kW peak power in an exemplary battery electric vehicle application. It is recognized herein, however, that sizing of the converter to peak power may result in undesirable electrical losses within the converter and other components of the electric drive system.

For example, DC-DC converters include a relatively large and heavy inductor coil, and thus tend to suffer from size-proportionate electrical losses within the inductor coil. To a lesser extent, such losses also occur in the structure and operation of the individual semiconductor switches of the converter. The present disclosure proceeds with the further recognition that, over a substantial portion of a drive cycle in some applications, a given electric drive system will operate at relatively low torque/power levels. The disclosed approach therefore uses a downsized converter, e.g., a buck-boost converter or a pure boost converter in two possible embodiments, to forego an acceptable amount of torque response in favor of improving overall energy efficiency.

An example embodiment of the electric drive system includes positive and negative bus rails carrying a bus voltage, an energy storage system or ESS connected to the bus rails and having a capacitor arranged in parallel with battery cells to provide a battery output voltage, a power inverter, a DC-DC converter, an electric machine, and a controller. The power inverter has a first plurality of semiconductor switches operable for inverting the bus voltage from DC into an AC bus voltage. The converter, which is connected to the bus rails between the capacitor and power inverter, has an inductor coil, a second plurality of semiconductor switches, a bypass switch connected to the positive bus rail, and an additional capacitor arranged across the bus rails. The electric machine has phase windings that are electrically connected to the power inverter.

In this example embodiment, the controller regulates operation of the DC-DC converter based on torque/power and speed values of the electric machine. The controller is also configured to adjust the bus voltage until the bus voltage is equal to the battery output voltage, and to thereafter selectively bypass the converter under predetermined high-power/high-torque operating conditions of the electric machine. This is achieved via a commanded closing of the bypass switch. The controller is also configured to adjust the bus voltage until the bus voltage is equal to the battery output voltage, and to thereafter selectively open the bypass switch and regulate the bus voltage to a predetermined value.

The controller may be further configured to regulate operation of the DC-DC converter using a calibrated performance map, e.g., a lookup table or plot, which is indexed or referenced by the torque/power and speed values noted above.

The DC-DC converter may be embodied as the boost converter, and the bypass switch may optionally include a pair of bi-directional or reverse blocking IGBTs. The converter may be alternatively embodied as a buck-boost converter.

The DC-DC converter may be rated in some embodiments for less than 50 percent of a peak power requirement of the electric machine, e.g., 30-45 kW in an example 90 kW peak power application.

The controller may control an on/off state of designated low-side (negative rail-connected) switches of the first plurality of semiconductor switches after closing the bypass switch, such that energy stored in the inductor coil of the converter is dissipated, and to thereafter temporarily disable the converter once the energy has dissipated.

The controller may also adjust a controller gain and separate d-axis and q-axis current commands to the electric machine subsequent to a mode change of the DC-Dc converter, and to output the adjusted d-axis and q-axis current commands to the electric machine.

In another embodiment, the electric drive system may include the voltage bus, ESS, and a power inverter noted above, along with a buck-boost converter connected to the voltage bus between the capacitor of the ESS and the power inverter. A polyphase electric machine used as part of the electric drive system has phase windings connected to the power inverter, with the buck-boost converter rated for less than 50 percent of a peak power requirement of the electric machine in this particular embodiment.

The controller may be programmed to regulate operation of the DC-DC converter using a predefined performance map. Such a map is indexed or referenced by a rotational speed value and torque or power values of the electric machine. The controller adjusts the bus voltage until the bus voltage equals the battery output voltage, selectively bypasses the converter by closing the bypass switch under predetermined high-power/high-torque operating conditions of the electric machine, and dissipates energy through control of the first plurality of semiconductor switches once the bypass switch has closed.

A switching control method is also disclosed for an electric drive system. The method may include receiving, via a controller, a rotational speed value and an estimated torque value of a polyphase electric machine of the electric drive system. The method includes using the received rotational speed and torque values to determine, using a predefined performance map, whether a change in operating mode of the converter is required. Additionally, the method includes regulating operation of the converter in response to determining that the change in operating mode is required, including adjusting a DC bus voltage between positive and negative voltage bus rails of the electric drive system until the bus voltage equals a battery output voltage of an ESS. Thereafter, the method includes closing, via the controller, a bypass switch of the converter between the ESS and a power inverter when the bus voltage equals the battery output voltage, so as to exit a buck mode or boost mode of the converter.

The above-noted and other features and advantages of the present disclosure are readily apparent from the following detailed description of the best modes for carrying out the disclosure when taken in connection with the accompanying drawings.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Figure 1:
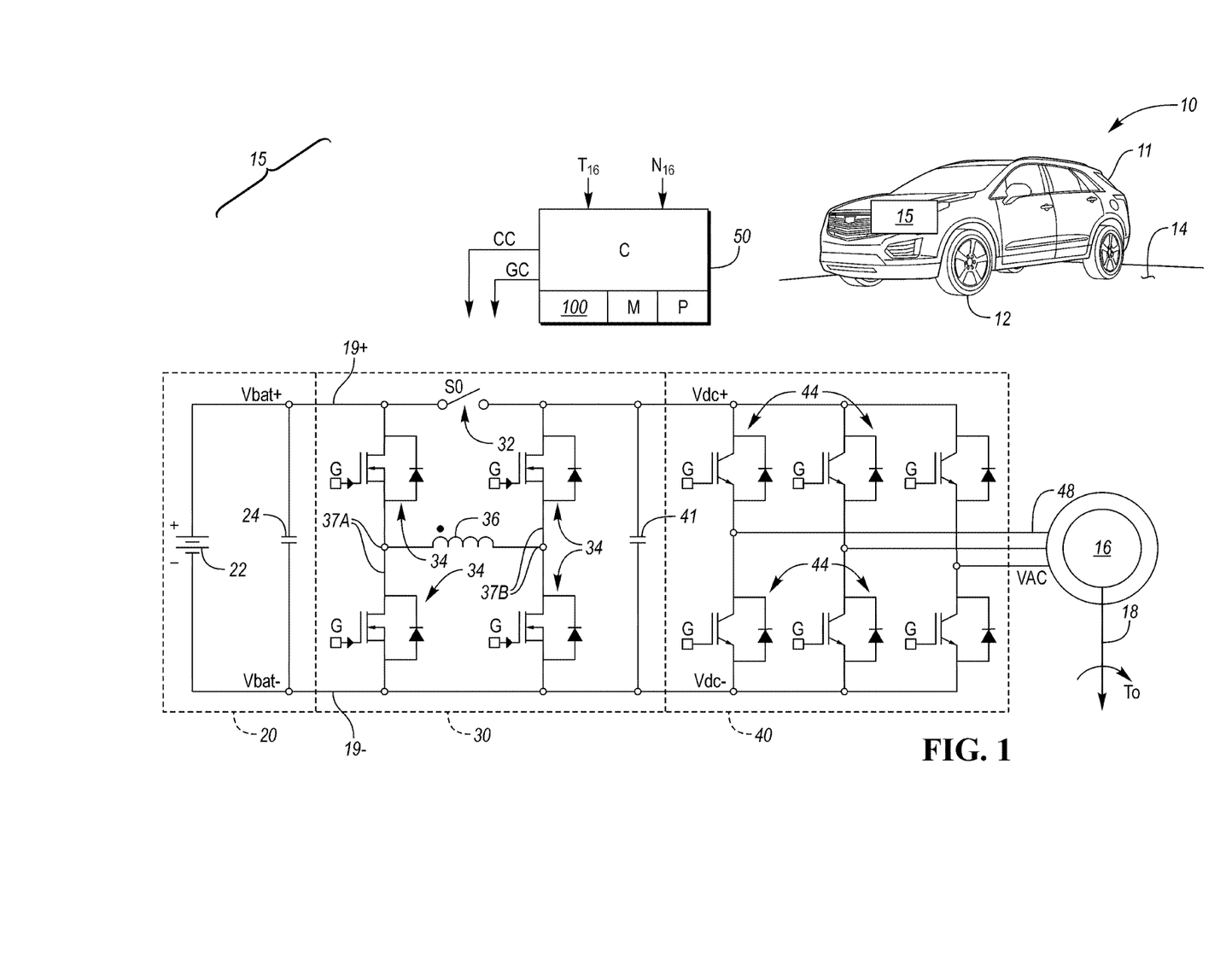
FIG. 1 is a schematic illustration of an example vehicle having an electric drive system with a buck-boost converter configured and controlled as set forth herein.

Referring to the drawings, wherein like reference numbers refer to like components throughout the several views, FIG. 1 depicts a schematic example vehicle 10 having a body 11 and an electric drive system 15. The vehicle 10 may be configured as a motor vehicle as shown, and therefore may be equipped with wheels 12 in rolling contact with a road surface 14. While the vehicle 10 of FIG. 1 is an example of a type of system benefiting from use of the present drive system 15, other applications for the drive system 15 may be readily envisioned, including but not limited to stationary power plants, mobile platforms, and other types of land, air, or marine vehicles.

The electric drive system 15 may include a polyphase electric machine 16 having a rotatable output shaft 18. When the electric machine 16 is energized via application of an alternating current (AC) polyphase voltage (VAC) to individual phase windings 48 of the electric machine 16, motor torque (arrow $T_O$) is generated and delivered to a coupled load, such as the road wheels 12 in the illustrated motor vehicle application. The electric machine 16 may be embodied as a three-phase/multi-phase motor or motor/generator unit, with each of the phase windings 48 carrying a corresponding phase current. In various example embodiments, the electric machine 16 may be constructed as an induction machine or as a synchronous machine with or without permanent magnets within its rotor.

The electric drive system 15 of FIG. 1 may also include an energy storage system (ESS) 20, a direct-current/direct-current (DC-DC) converter 30, and a power inverter 40. The ESS 20 may include a plurality of battery cells 22, e.g., rechargeable lithium ion battery cells arranged in a stack, and a capacitor 24 arranged in parallel with the battery cells 22. The number and arrangement of battery cells 22 may vary with the intended application, for instance with 96 or more such battery cells 22 used in certain high-voltage applications. A battery output voltage (Vbat+, Vbat−) is delivered to respective positive and negative voltage bus rails 19+, 19−, with a DC bus voltage (Vdc+ and Vdc−) present on the voltage bus rails 19+, 19− downstream of/on the output side of the DC-DC converter 30 as shown.

Within the electric drive system 15, the power inverter 40 is electrically connected to the phase windings 48 of the electric machine 16, and includes a first plurality of semiconductor switches 44 and another capacitor 41. The semiconductor switches 44 are arranged in upper and lower sets as shown, with the terms "upper" and "lower" referring to the semiconductor switches 44 connected to the positive and negative bus rails 19+ and 19−, respectively. The semiconductor switches 44 may be embodied as voltage-controlled bipolar switching devices in the form of insulated gate bipolar transistors (IGBTs), metal-oxide semiconductor field effect transistors (MOSFETs), wideband GaN devices (WBG), or other suitable switches having a corresponding gate (G) to which a gate signal (arrow GC) is applied to change the on/off state of a given one of the semiconductor switches 44.

Still referring to FIG. 1, the DC-DC converter 30 in the illustrated embodiment may be optionally configured as a buck-boost converter having another set of semiconductor switches 34, with the term "buck" referring to a voltage-reducing mode of operation and "boost" referring to a voltage-increasing mode of operation. As with the semiconductor switches 44 within the power inverter 40, semiconductor switches 34 of the converter 30 may be constructed of highly efficient switches such as wide-gap gallium nitride (GaN) or silicon carbide (SiC) MOSFETs, IGBTs, or other suitable switching devices arranged in upper and lower switching sets, with each of the upper semiconductor switches 34 connected to a respective one of the lower semiconductor switches 34 via a respective voltage leg 37A or 37B. Further within the converter 30, an inductor coil 36 extends between the voltage legs 37A and 37B.

Figure 2:
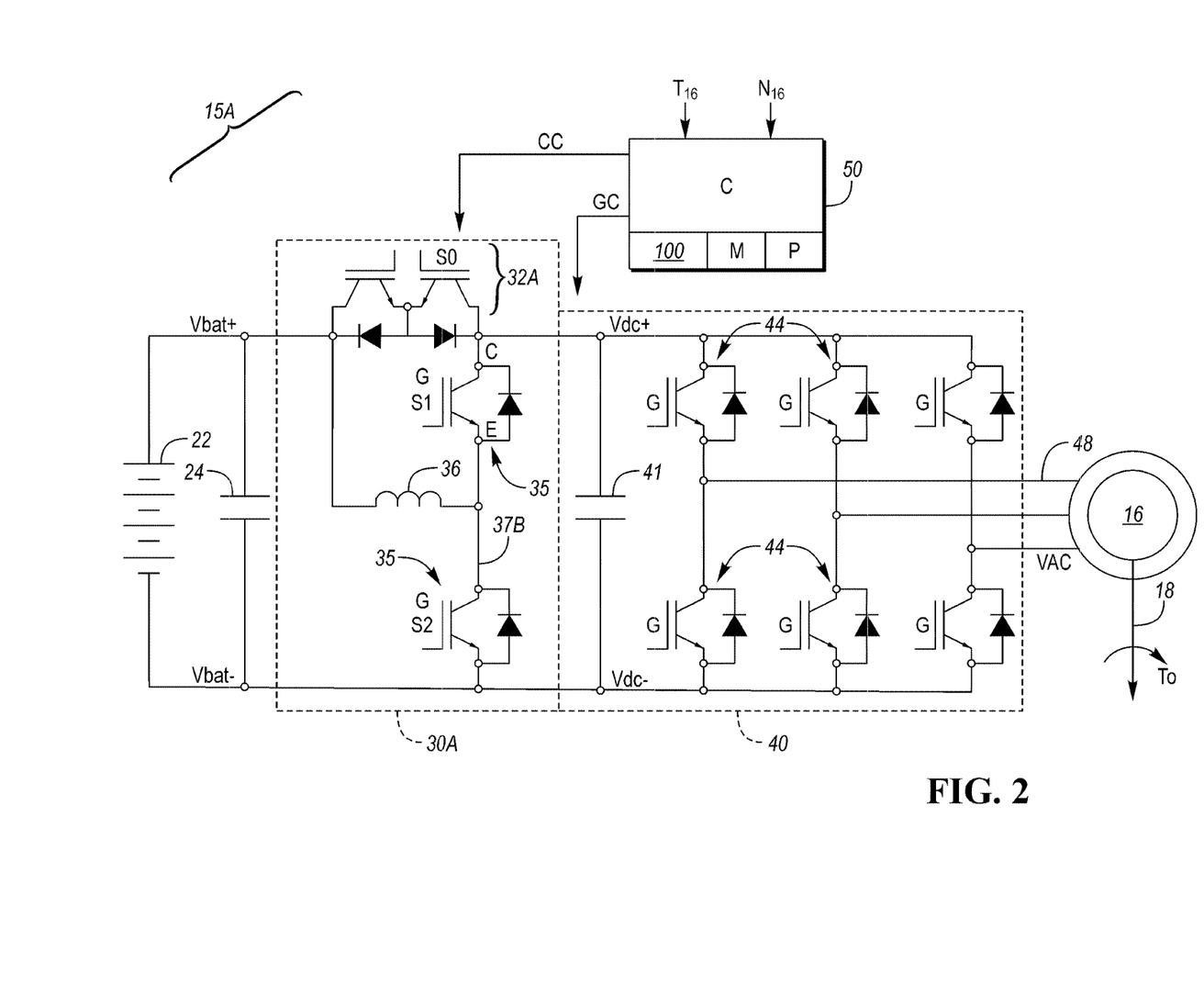
FIG. 2 is a schematic illustration of an alternative electric drive system using a pure boost converter in lieu of the buck-boost converter of FIG. 1.

The DC-DC converter 30 of FIG. 1 additionally includes a bypass switch 32, also labeled S0. The bypass switch 32 is selectively opened or closed in response to switching control signals (arrow CC) transmitted by a controller (C) 50. The bypass switch 32 may be constructed of an electromechanical relay when response time is not critical, or the bypass switch 32 may be constructed of faster-acting semiconductor devices such as efficient bi-directional block solid-state IGBT switches or reverse blocking IGBTs as shown in FIG. 2. As with the inductor coil 36, the bypass switch 32 is arranged between the voltage legs 37A and 37B, and is disposed on the positive voltage bus rail 19+. Thus, closing of the bypass switch 32 in response to the switching control signals (arrow CC) causes the DC-DC converter 30 to be bypassed, with the particular conditions calling for closing of the bypass switch 32 and the resultant bypassing of the converter 30 determined in real-time by the controller 50 as set forth below with reference to FIG. 4.

The controller 50, which is in communication with the electric machine 16 over a controller area network or other communication bus, may be configured as a single device or as a distributed control device. Although omitted from FIG. 1, connectivity of the controller 50 to the electric drive system 15 may include transfer conductors and/or wireless control links or paths suitable for transmitting and receiving the switching control signals (arrow CC). The controller 50 may include a processor (P) and tangible, non-transitory memory (M), including read only memory in the form of optical, magnetic, or flash memory. The controller 50 may also include sufficient amounts of random access memory and electrically-erasable programmable read only memory, as well as a high-speed clock, analog-to-digital and digital-to-analog circuitry, and input/output circuitry and devices, as well as appropriate signal conditioning and buffer circuitry. Computer-readable instructions are recorded in memory (M) embodying a method 100, with the execution of such logic by the processor (P) causing the controller 50 to manage the flow of electrical power within the electric drive system 15.

In the present method 100, the controller 50 is programmed to receive a reported motor torque (arrow $T_{16}$), e.g., an estimated or calculated value approximating the motor output torque (arrow $T_O$). Such a value may be available from a motor control processor (not shown) of the electric machine 16 using, for instance, a lookup table indexed or referenced by the calculated power and measured or reported rotational speed value (arrow $N_{16}$) of the electric machine 16. The controller 50 uses the reported motor torque value (arrow $T_{16}$) and the speed value (arrow $N_{16}$) to determine precisely when to open or close the bypass switch 32, or a bypass switch 32A of an alternative DC-DC converter 30A in the alternative electric drive system 15A shown in FIG. 2.

Referring briefly to FIG. 2, the buck-boost-type of DC-DC converter 30 shown in FIG. 1 may be alternatively embodied as a DC-DC converter 30A in the form of a pure boost-type converter, and thus lacking a buck/voltage-reducing mode. In this embodiment, an alternative bypass switch 32A may be used in place of the bypass switch 32 shown in FIG. 1, for instance configured as a pair of IGBTs arranged back-to-back as shown to form a reverse blocking IGBT configuration. The semiconductor switches 34 of FIG. 1 in turn may be replaced with fewer semiconductor switches 35, shown here as representative first (upper) and second (lower) switches S1 and S2 each having a corresponding gate (G). While the configuration of FIG. 2 does not allow for operation in buck mode, the method 100 may be readily adapted to use with the electric drive system 15A when a pure boost-type DC-DC converter 30A is used.

Figure 3:
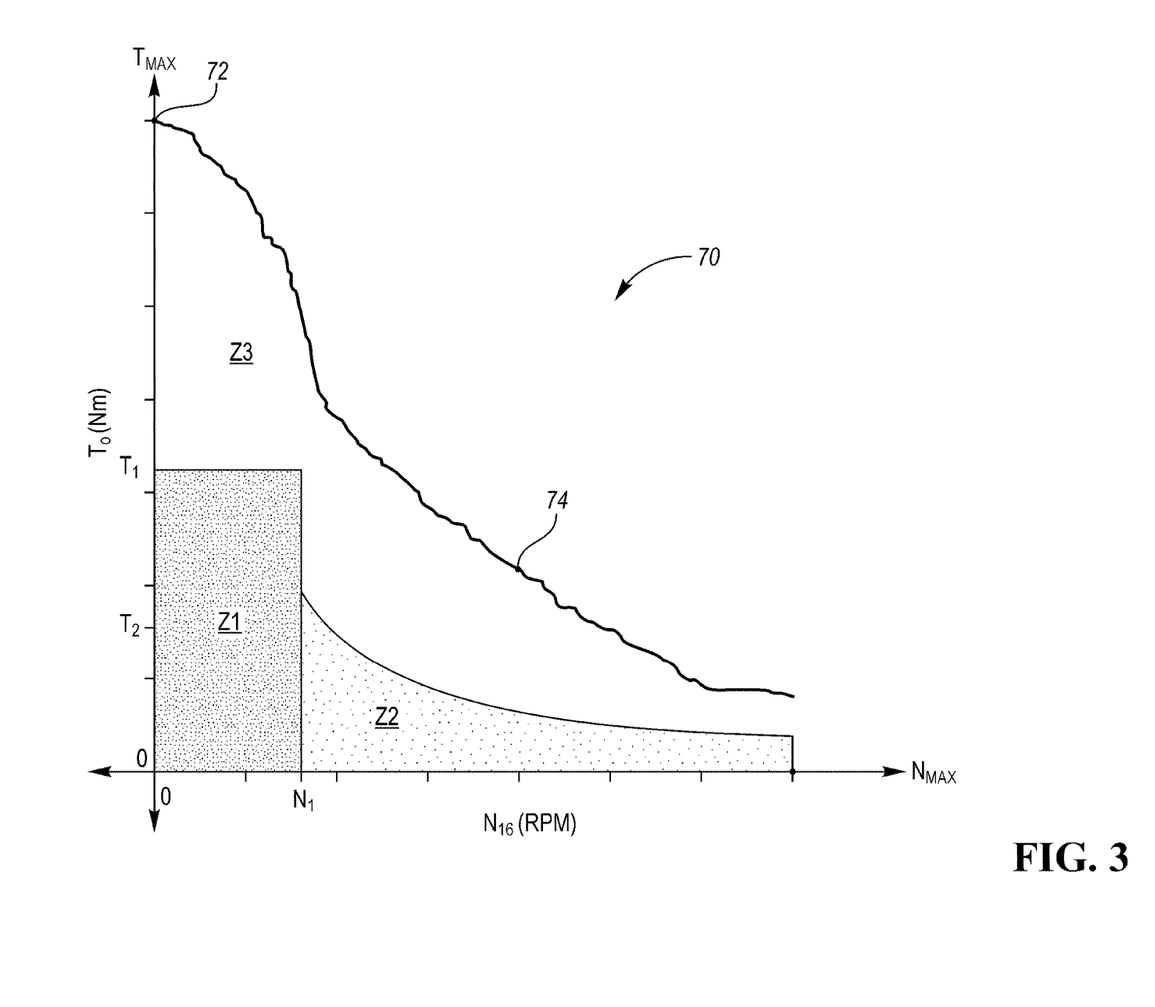
FIG. 3 is a performance plot depicting three zones of operation for controlling the example buck-boost converter of FIG. 1.

FIG. 3 is an example of a calibrated or pre-defined performance map 70 depicting usage of the example electric machine 16 and the buck-boost-type converter 30 of FIG. 1, with the performance map 70 determined based on power and speed at different operating points. A similar map may be used with the boost converter 30A of FIG. 2 if adjusted so as not to include a corresponding buck mode zone. For instance, the performance map 70 may be indexed or referenced by motor output torque ($T_O$) in Newton-meters (Nm) on the vertical axis and motor rotational speed ($N_{16}$) on the horizontal axis. The performance map 70 may also be further indexed by torque or power requirements, e.g., on another vertical axis (not shown). The controller 50 may be programmed with data embodying the performance map 70, with the controller 50 extracting such data from the performance map 70 from memory (M) during ongoing operation of the vehicle 10.

The performance map 70 of FIG. 3 may include first, second, and third operating zones Z1, Z2, and Z3, respectively. The first operating zone Z1 corresponds to operation of the electric machine 16 with relatively low-speed and low-torque. For instance, for a maximum rotational speed ($N_{MAX}$) of about 12,000 revolutions per minute (RPM), the speed range defining the first operating zone Z1 may range from 0 RPM to a lower speed point $N_1$ of about 2,000 RPM, or in the alternative, from 0 RPM to about 15-20 percent of the maximum rotational speed ($N_{MAX}$). The corresponding motor output torque ($T_O$) in Newton-meters (Nm) ranges from 0 Nm to a first maximum torque $T_1$, e.g., about 175 Nm in an example embodiment in which the peak torque requirement ($T_{MAX}$) at a torque point 72 is about 350 Nm, or about 200 percent of the peak torque requirement ($T_{MAX}$).

The second operating zone Z2 corresponds to relatively high-speed, low-power operation of the electric machine 16. That is, the rotational speed $N_{16}$ of the electric machine 16 in the second operating zone Z2 exceeds the rotational speed of the electric machine 16 while operating in the first operating zone Z1, and may be as high as the maximum rotational speed ($N_{MAX}$). The second operating zone Z2 has a second maximum torque ($T_2$) that is less than the first maximum torque ($T_1$) of the first performance zone Z1, with the second maximum torque ($T_2$) being about 125 Nm in the example embodiment in which the peak torque requirement ($T_{MAX}$) is about 350 Nm. In this or other embodiments, the second maximum torque ($T_2$) may be about 30-40 percent of the peak torque requirement ($T_{MAX}$).

The third operating zone Z3 of FIG. 3 corresponds to the remainder of the performance plot 70, i.e., low-speed/high-torque or high-speed/high-power operations. That is, when the electric machine 16 of FIG. 1 is not being operated in the first or second operating zones Z1 or Z2, the default mode may include operation in the third performance zone Z3. Thus, trace 74 defines the corresponding maximum allowable output torque of the electric machine 16 for a given rotational speed ($N_{16}$). The actual torque, speed, and power values associated with trace 74 and each of the operating zones Z1, Z2, and Z3 may vary with the intended application.

As will be explained in further detail with reference to FIG. 4, the controller 50 of FIG. 1 is configured via programming and hardware equipment to monitor performance parameters of the electric machine 16 and, in response to such monitored performance parameters, to selectively operate the DC-DC converter 30 in one of the three above-described operating zones Z1, Z2, or Z3, or the DC-DC converter 30A in operating zones Z2 or a combination of Z1 and Z3. That is, in a pure boost converter configuration zones Z1 and Z3 are combined while the boost converter 30A is bypassed. In the performance of the method 100, the first operating zone Z1 is designated as a "buck zone" in which the bypass switch S0 is commanded open, followed by switching control of the DC-DC converter 30 in buck (voltage-reducing) mode so as to reduce the voltage level into the power inverter 40.

The second operating zone Z2 is designated herein as a "boost zone" in which the bypass switch S0 is commanded open, followed by switching control of the DC-DC converter 30 or 30A in boost (voltage-increasing) mode so as to increase the voltage level to the power inverter 40. In the third operating zone Z3, the bypass switch S0 is commanded closed so as to fully bypass the DC-DC converter 30 or 30A. As noted above, for embodiments using the DC-DC converter 30A, which is not capable of operating in buck mode, the method 100 may still be followed for operating zones Z2 and (Z1+Z3).

The method 100 is executed according to a particular sequence to ensure that the energy stored in the inductor coil 36 of FIGS. 1 and 2 is effectively dissipated before activation of the bypass switch 32 or 32A, and to thereby ensure efficient operation of the DC-DC converter 30 or 30A. During buck mode or boost mode, the DC voltage at the input to the power inverter 40 may be set to a fixed predefined value to reduce cost and simplify control, as well as to capture most of the available fuel economy benefit, or the DC-DC converter 30 or 30A may be controlled to an optimal level to reduce system losses, with voltage controlled as a function of speed, duty cycle, and/or power consumption of the electric machine 16. Hysteresis is added when switching from one mode of the DC-DC converter 30 or 30A to another, e.g., from buck mode to boost mode or vice versa. When closing the bypass switch 32 or 32A of respective FIGS. 1 and 2, the method 100 is executed so that voltage across the bypass switch 32 or 32A is kept at or near zero. This in turn avoids undesirable voltage transients. The bypass switch 32 or 32A is then closed by operation of the controller 50 when the bus voltage (Vdc+, Vdc−) is nearly equal to the battery output voltage (Vbat+, Vbat−).

After the DC-DC converter 30 or 30A is effectively bypassed by operation of the bypass switch 32 or 32A, energy stored in the inductor coil 36 is dissipated. Energy dissipation may be achieved by controlling the open/closed state of the semiconductor switches 34 of FIG. 1 or the upper semiconductor switch 35 of FIG. 2 in a manner that shorts the inductor coil 36 while controlling the electrical current passing through the bypass switch 32 or 32A to a level that is less than a rated current for the switches 34 or 35.

Figure 4:
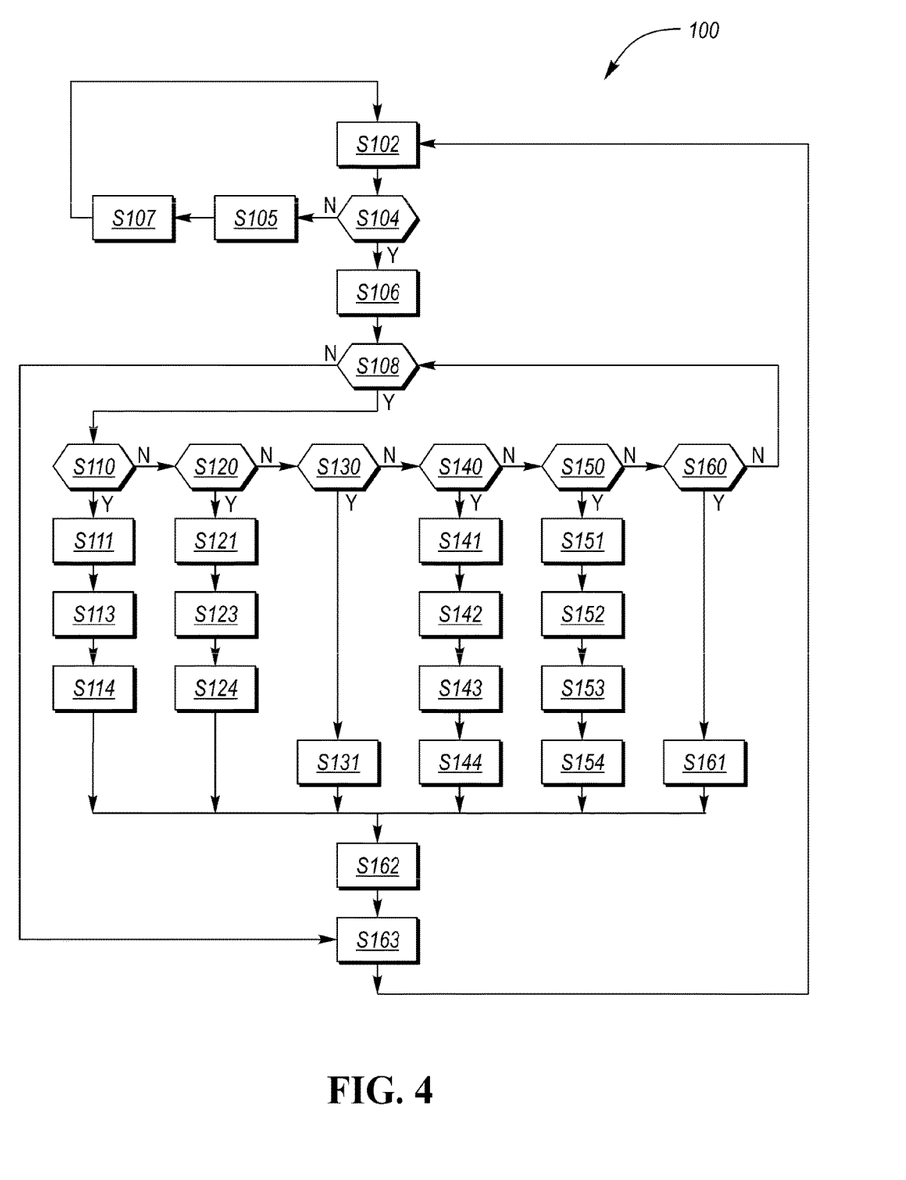
FIG. 4 is a flow chart describing an example method for controlling the buck-boost converter of FIG. 1 or the pure boost converter of FIG. 2.

Referring to FIG. 4, an example embodiment of the method 100 begins with step S102, wherein the controller 50 of FIGS. 1 and 2 reads or receives a present speed, commanded torque, and estimated torque of the electric machine 16, as well as fault codes pertaining to operation of the converter 30 or 30A and power inverter 40. The present speed may be reported or measured, e.g., via a speed sensor connected to the output shaft 18. Commanded torque is a value from logic of the controller 50 determined, for instance, in response to dynamic inputs such as brake and accelerator pedal position and gear state or powertrain operating mode. Estimated torque refers to a calculated or modeled estimate of the actual torque provided by the electric machine 16. The method 100 then proceeds to step S104 once the above-described speed, torques, and fault codes are determined.

Step S104 includes determining if the fault codes read at step S102 have been cleared, i.e., if such fault codes are not presently active indicating that the power inverter 40 and DC-DC converter 30 or 30A are operating properly. The method 100 proceeds to step S105 if the fault codes are active and to step S106 if the fault codes have been cleared.

Step S105 includes disabling an inverter gate signal to the power inverter 40 and then bypassing the converter 30 or 30A, e.g., via operation of the bypass switch 32 or 32A. As noted above, the power inverter 40 is controlled via pulse-width modulation (PWM) signals or other switching signals to invert a DC voltage into an AC voltage or vice versa, with the on/off state of the individual semiconductor switches 44 within the power inverter 40 responsive to inverter gate signals. Likewise, the controller 50 is configured to selectively close the bypass switch 32 or 32A to bypass the converter 30 or 30A. The method 100 then proceeds to step S107.

Step S106 includes calculating the power requirements of the electric machine 16 and determining the corresponding operating mode of the electric drive system 15 or 15A based on the required torque/power and speed of the electric machine 16. In logic of the controller 50, for instance, each operating mode may be assigned a corresponding integer value, e.g., with the normal/bypassed mode (the third operating zone Z3) corresponding to "3", the buck mode (first operating zone Z1) corresponding to "1" when the buck-boost converter 30 is used, and the boost mode (second operating zone Z2) corresponding to "2". The method 100 then proceeds to step S108.

At step S107, the controller 50 awaits a fault reset of the fault codes and repeats step S102.

At step S108, the controller 50 next determines whether a mode change of the DC-DC converter 30 or 30A is active or imminent based on the results of step S106. The term "mode change" is taken relative to an operating mode of the DC-DC converter 30 or 30A in an immediately-prior iteration of the method 100. If such a change is active or imminent, the method 100 proceeds to step S110. The method 100 proceeds instead to step S163 when a mode change is not active or imminent.

Step S110 includes determining whether an operating mode change is imminent from mode 3 to mode 1, i.e., from the normal/bypassed mode (third operating zone Z3) to the first operating zone Z1 (buck mode). As step S110-S114 pertain to buck mode control, the system 15A of FIG. 2 is not usable with steps S110-114 and may be disregarded when using the converter 30A of FIG. 2. The method 100 proceeds to step S111 when such a change is imminent, and to step S120 in the alternative when the mode 3 to mode 1 change is not imminent.

Step S111 includes enabling the DC-DC converter 30 of FIG. 1 in buck mode and proceeding to step S113. As step S111 pertains to buck mode control, the electric drive system 15A of FIG. 2 is not usable with steps S111-114, and therefore these steps may be disregarded when using the DC-DC converter 30A of FIG. 2.

At step S113 the controller 50 opens the bypass switch 32 of FIG. 1 in preparation for the enabled buck mode. The method 100 then proceeds to step S114.

At step S114, the controller 50 ramps down the DC bus voltage, i.e., (Vdc+, Vdc−) in buck mode until the DC bus voltage reaches a predetermined optimal value, while also maintaining torque at the required level. The method 100 then proceeds to step S162.

At step S120, the controller 50 determines whether a change is imminent from mode 3 to mode 2, i.e., from the normal/bypassed mode (third operating mode Z3) to the second operating mode Z2 (boost mode). The method 100 proceeds to step S121 when such a change is imminent, and to step S130 in the alternative when the mode 3 to mode 2 change is not imminent.

Step S121 includes enabling the DC-DC converter 30 or 30A in boost mode and proceeding to step S123.

At step S123 the controller 50 next opens the bypass switch 32 or 32A, i.e., via transmission of a switching signal as part of the switching control signals (arrow CC). The method 100 then proceeds to step S124.

At step S124, the controller 50 ramps up the DC bus voltage (Vdc+, Vdc−) in boost mode to reach a predetermined optimal voltage while at the same time maintaining torque from the electric machine 16 at a desired level. The method 100 then proceeds to step S162.

Step S130 includes determining whether a change is imminent from mode 1 to mode 2, i.e., from the first operating zone Z1 (buck mode) to the second operating zone Z2 (boost mode). As step S130 and S131 pertain in part to buck mode control, the system 15A of FIG. 2 is not usable with steps S130 and S131, and therefore these two steps may be disregarded when using the DC-DC converter 30A of FIG. 2.

The method 100 proceeds to step S131 when such a change is imminent, and to step S140 in the alternative when the mode 1 to mode 2 change is not imminent.

Step S131 includes ramping up the DC bus voltage to a predetermined optimal value while maintaining torque at the required level. The method 100 then proceeds to step S162.

At step S140, the method 100 includes determining whether a change is imminent from mode 1 to mode 3, i.e., from the buck mode (first operating zone Z1) to the normal/bypassed operating zone Z3. As steps S140-S144 pertain in part to buck mode control, the system 15A of FIG. 2 is not usable with steps S140-144 and therefore these steps may be disregarded when using the optional DC-DC converter 30A of FIG. 2.

The method 100 proceeds to step S141 when such a change is imminent, and to step S150 in the alternative when the mode 1 to mode 3 change is not imminent.

Step S141 includes controlling the DC-DC converter 30 to ramp the DC bus voltage (Vdc+, Vdc−) until the DC bus voltage is equal to the battery voltage (Vbat+, Vbat−), and then proceeding to step S142.

At step S142 the controller 50 closes the bypass switch 32 and then proceeds to step S143.

At step S143, the controller 50 controls one of the lower semiconductor switches of the DC-DC converter 30 to short the inductor coil 36 and thereby dissipate energy stored therein. The method 100 then proceeds to step S144.

Step S144 entails disabling the DC-DC converter 30 before proceeding to step S162.

Step S150 includes determining whether a change is imminent from operating mode 2 to mode 3, i.e., from the boost mode (second operating zone Z2) to the normal/bypassed operating mode (third operating zone Z3). The method 100 proceeds to step S151 when such a change is imminent, and to step S160 in the alternative when the mode 1 to mode 2 change is not imminent.

Step S151 includes controlling the DC-DC converter 30 or 30A to ramp down the DC bus voltage (Vdc+, Vdc−) until the DC bus voltage is equal to the battery voltage (Vbat+, Vbat−), and then proceeding to step S152.

At step S152 the controller 50 closes the bypass switch 32 or 32A via the switching control signals (arrow CC) and proceeds to step S153.

At step S153, the controller 50 controls one of the lower semiconductor switches 34 or 35 of the respective DC-DC converter 30 or 30A to short the inductor coil 36 and thereby dissipate energy stored therein. The method 100 then proceeds to step S154.

Step S154 entails temporarily disabling the DC-DC converter 30 or 30A, such as via changing of a logic bit, before proceeding to step S162.

Step S160 includes determining whether a change is imminent from operating mode 2 to operating mode 1, i.e., from the boost mode (second operating zone Z2) to the buck operating mode (first operating zone Z1). As steps S160 and S161 pertain in part to buck mode control, the system 15A of FIG. 2 is not usable with steps S160 and S161 and may be disregarded when using the DC-DC converter 30A of FIG. 2.

The method 100 proceeds to step S161 when such a change is imminent, and repeats step S108 in the alternative when the mode 2 to mode 1 change is not imminent.

At step S161, the controller 50 regulates the bus voltage, such as by ramping down the bus voltage to a predetermined optimal voltage value while still maintaining the output torque of the electric machine 16 at a desired value. The method 100 then proceeds to step S162.

Step S162 includes adjusting the d-axis and q-axis current commands to the electric machine 16 and control parameters of the controller 50 as necessary, such as proportional gains (P-gains) and integral gains (I-gains) for a proportional-integral (PI) controller embodiment, based on the present commanded torque and current operating mode from step S106. As used in the art, the term "d-axis current" refers to the flux-generating current command from the controller 50 while the "q-axis current" is the torque-producing current. The method 100 then proceeds to step S163.

At step S163, the controller 50 outputs the d-axis and q-axis current commands to the electric machine 16 based on the current speed, commanded torque, and current operating mode of the electric machine 16. The method 100 then returns to step S102.

The method 100 described above as used with the electric drive system 15 or 15A of FIG. 1 or 2 is intended to provide improved power and efficiency under partial load conditions relative to existing approaches. As the inductor coil 36 of FIGS. 1 and 2 adds significant size and mass to the electric drive system 15 or 15A, the smaller DC-DC converter 30 or 30A enabled by this disclosure, for instance reducing from 90 kW peak power to 30 kW peak power, allows for use of inductor coils 36 having correspondingly low current ratings, e.g., about 150 amps for a downsized inductor coil 36 from 450 amps for typical 90 kW systems, as well as reducing the required size of the inverter capacitor 41 and semiconductor switches 34 and 35. These and other benefits will be readily appreciated by those possessing ordinary skill in the art in view of the disclosure.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed is:

1. An electric drive system comprising:
   positive and negative bus rails carrying a direct current (DC) bus voltage;
   an energy storage system (ESS) connected to the positive and negative bus rails, and having battery cells and a capacitor arranged in parallel with the battery cells to provide a battery output voltage;
   a power inverter having a first plurality of semiconductor switches operable for inverting the DC bus voltage into an alternating current (AC) bus voltage;

a DC-DC converter connected to the positive and negative bus rails between the capacitor and the power inverter, and having an inductor coil, a second plurality of semiconductor switches, a bypass switch connected to the positive bus rail, and an additional capacitor arranged across the positive and negative bus rails;

an electric machine having phase windings that are electrically connected to the power inverter; and a controller programmed to regulate operation of the DC-DC converter based on power, torque, and speed values of the electric machine, to adjust the DC bus voltage until the DC bus voltage is equal to the battery output voltage, to selectively bypass the DC-DC converter by closing the bypass switch under predetermined high-power/high-torque operating conditions of the electric machine when the DC bus voltage is equal to the battery output voltage, and to selectively open the bypass switch and thereafter regulate the DC bus voltage to a predetermined voltage.

2. The electric drive system of claim 1, wherein the controller is configured to regulate operation of the DC-DC converter based on power, torque, and speed values of the electric machine using a calibrated performance map indexed or referenced by the power, torque, and speed values.

3. The electric drive system of claim 2, wherein the DC-DC converter is a boost converter and the bypass switch includes a pair of bi-directional or reverse blocking IGBTs.

4. The electric drive system of claim 2, wherein the DC-DC converter is a buck-boost converter.

5. The electric drive system of claim 1, wherein the DC-DC converter is rated for less than 50 percent of a peak power requirement of the electric machine.

6. The electric drive system of claim 1, wherein the controller is programmed to control an on/off state of designated low-side switches of the first plurality of semiconductor switches after closing the bypass switch such that energy stored in the inductor coil is dissipated, and to thereafter disable the DC-DC converter once the energy has dissipated.

7. The electric drive system of claim 1, wherein the controller is programmed to control the on/off state of each of the first plurality of semiconductor switches after opening the bypass switch and ramp the DC bus voltage to a predetermined level while maintaining an estimated torque output of the electric machine.

8. The electric drive system of claim 1, wherein the controller is configured to adjust a controller gain and d-axis and q-axis current commands of the electric machine subsequent to the mode change, and to output the adjusted d-axis and q-axis current commands to the electric machine.

9. The electric drive system of claim 1, wherein the electric machine is connected to road wheels of a vehicle.

10. An electric drive system comprising:

a voltage bus having positive and negative bus rails carrying a direct current (DC) bus voltage;

an energy storage system (ESS) connected to the voltage bus, and having battery cells arranged in parallel with a battery capacitor so as to provide a battery output voltage;

a power inverter having a first plurality of semiconductor switches operable for inverting the DC bus voltage into an alternating current (AC) bus voltage;

a DC-DC buck-boost converter connected to the voltage bus between the battery capacitor and the power inverter, and having an inductor coil, a second plurality of semiconductor switches, a solid-state bypass switch connected to the positive bus rail, and a capacitor arranged across the positive and negative bus rails;

a polyphase electric machine having phase windings that are electrically connected to the power inverter, wherein the DC-DC buck-boost converter is rated for less than 50 percent of a peak power requirement of the electric machine; and a controller programmed to regulate operation of the DC-DC converter using a predefined performance map indexed or referenced by a rotational speed value and torque or power values of the electric machine, adjust the DC bus voltage until the DC bus voltage is equal to the battery output voltage, selectively bypass the DC-DC converter by closing of the bypass switch under predetermined high-power/high-torque operating conditions of the electric machine, dissipate energy through the first plurality of semiconductor switches once the bypass switch has closed, and open the bypass switch and thereafter regulate the DC bus voltage to a predetermined voltage.

11. The electric drive system of claim 10, wherein the controller is configured to command the bypass switch to open and thereby initiate a buck mode in response to the speed and torque/power values.

12. The electric drive system of claim 10, wherein the controller is programmed to disable the DC-DC converter once the energy has dissipated.

13. The electric drive system of claim 10, wherein the controller is programmed to control the on/off state of each of the first plurality of semiconductor switches after opening the bypass switch, and to control the DC bus voltage to a predetermined voltage while maintaining an estimated torque output of the electric machine.

14. The electric drive system of claim 10, wherein the controller is configured to adjust a controller gain and d-axis and q-axis current commands of the electric machine subsequent to the mode change, and to output the adjusted d-axis and q-axis current commands to the electric machine.

15. The electric drive system of claim 10, wherein the electric machine is connected to road wheels of a vehicle.

16. A switching control method for an electric drive system, the method comprising:

receiving, via a controller, a rotational speed value and an estimated torque value of a polyphase electric machine of the electric drive system;

using the received rotational speed value and torque value to determine, using a predefined performance map, whether a change in operating mode of a direct-current/direct-current (DC-DC) converter is required;

regulating operation of the DC-DC converter in response to determining that the change in operating mode of the DC-DC converter is required, including adjusting a bus voltage between positive and negative voltage bus rails of the electric drive system until the bus voltage is equal to a battery output voltage of an energy storage system (ESS) connected to the positive and negative voltage bus rails; and closing, via the controller, a bypass switch of the DC-DC converter connected between the ESS and a power inverter of the electric drive system when the DC bus voltage equals the battery output voltage so as to exit a buck mode or a boost mode of the DC-DC converter.

17. The method of claim 16, further comprising:

selectively bypassing the DC-DC converter by closing the bypass switch under predetermined high-power/high-torque operating conditions of the electric machine.

18. The method of claim 17, further comprising:
controlling an on/off state of designated low-side switches of the first plurality of semiconductor switches after closing the bypass switch such that energy stored in the inductor coil is dissipated; and
disabling the DC-DC converter once the energy has dissipated.

19. The method of claim 16, further comprising:
adjusting a controller gain and d-axis and q-axis current commands of the electric machine subsequent to the mode change; and
outputting the adjusted d-axis and q-axis current commands to the electric machine.

20. The method of claim 19, wherein the electric machine is connected to road wheels of a vehicle, and wherein outputting the adjusted d-axis and q-axis current commands to the electric machine includes powering phase windings of the electric machine sufficiently for propelling the vehicle.

\* \* \* \* \*